Sept. 16, 1947.　　　E. A. ROCKWELL　　　2,427,623
ADJUSTABLE BOWDEN WIRE
Original Filed June 9, 1944　　3 Sheets-Sheet 1
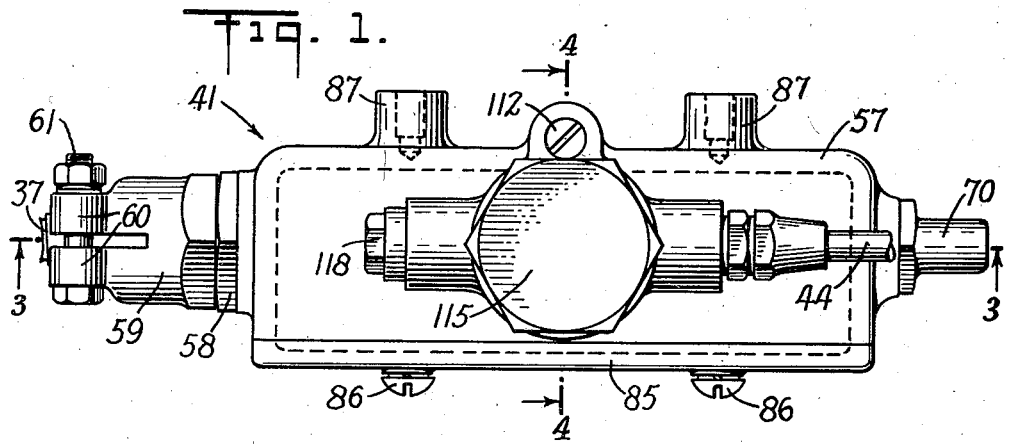
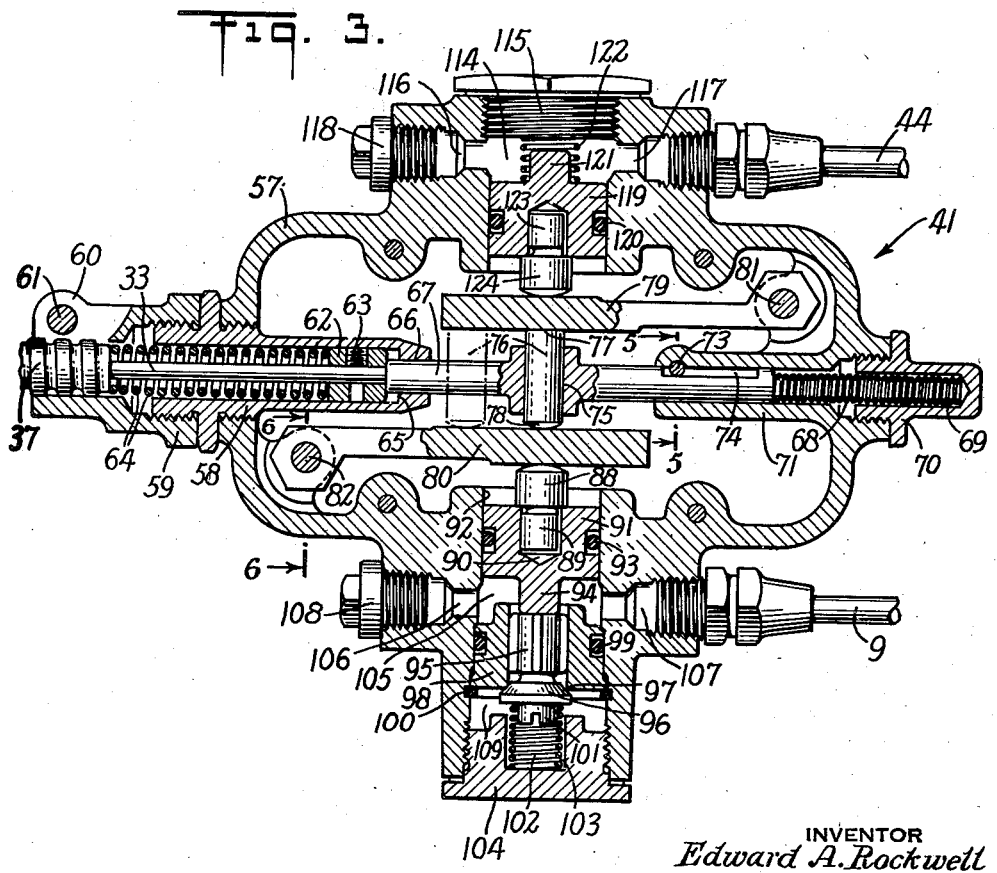
INVENTOR
*Edward A. Rockwell*
BY
*Arthur Bright*
ATTORNEY

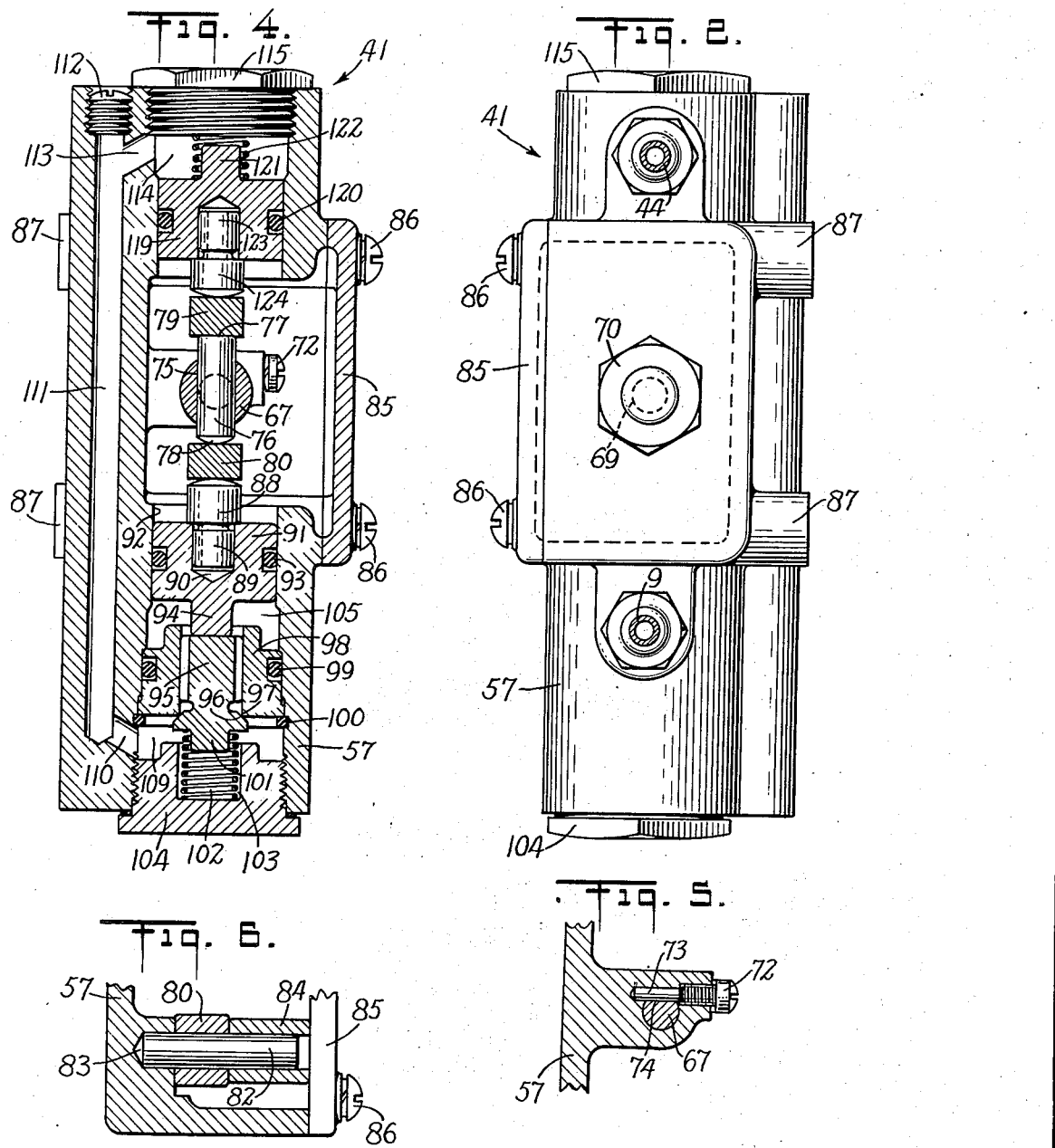

Sept. 16, 1947.　　　E. A. ROCKWELL　　　2,427,623
ADJUSTABLE BOWDEN WIRE
Original Filed June 9, 1944　　3 Sheets-Sheet 3
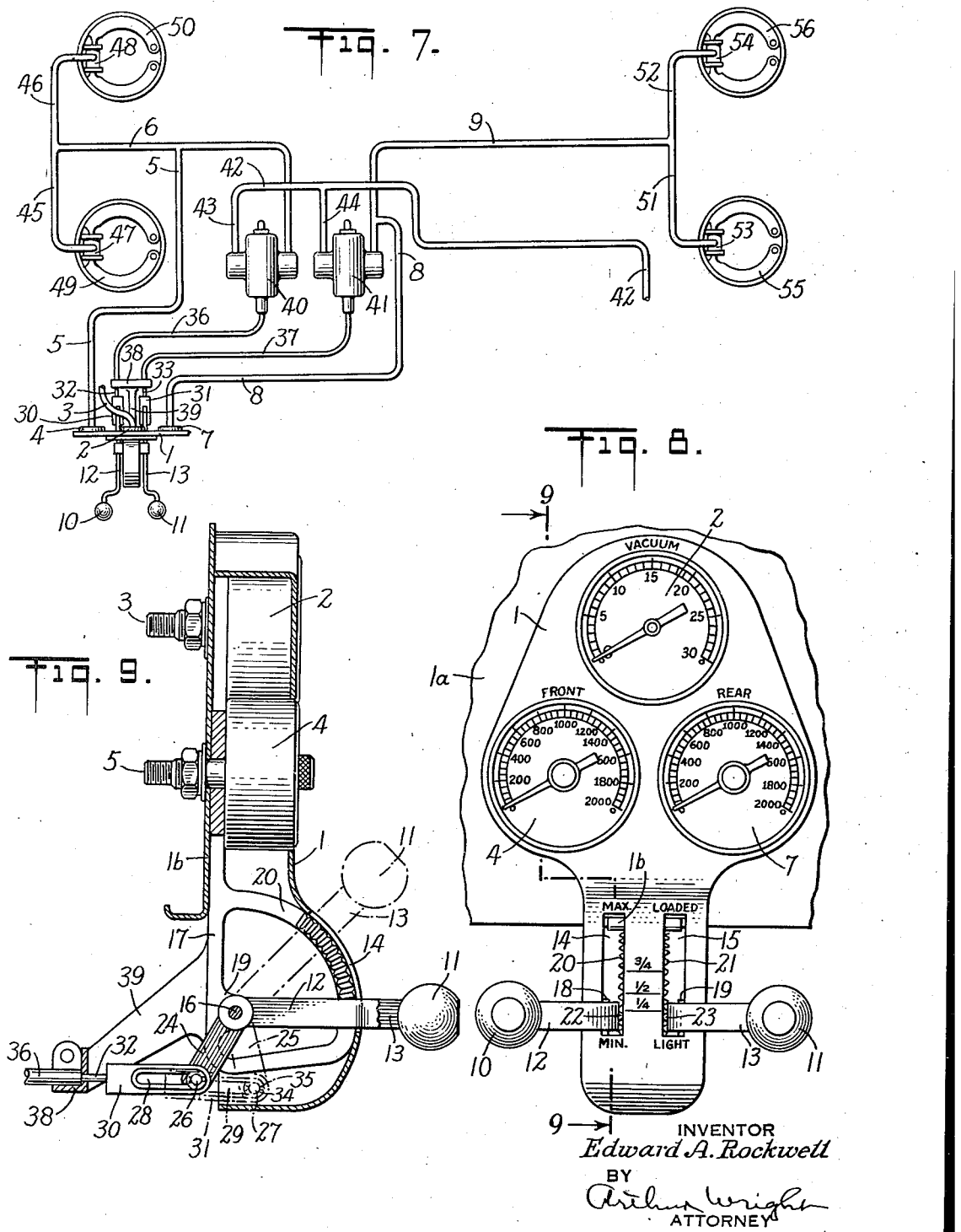
INVENTOR
Edward A. Rockwell
BY
Arthur Wright
ATTORNEY Patented Sept. 16, 1947

2,427,623

UNITED STATES PATENT OFFICE 2,427,623

ADJUSTABLE BOWDEN WIRE

Edward A. Rockwell, Cleveland, Ohio

Original application June 9, 1944, Serial No. 539,583. Divided and this application February 22, 1945, Serial No. 579,293

12 Claims. (Cl. 74—501)

My invention relates particularly to an adjusting means for controlling any desired apparatus or mechanism, although it is especially useful in the adjustment of proportional pressure distributor valves.

This application is a division of my application Ser. No. 539,583, filed June 9, 1944, upon Proportional pressure distributor valve.

The object of my invention is to provide means for adjusting the ratio of distributors. Another object is to provide a manually adjusting mechanism for adjusting a plurality of fluid pressures by means of a Bowden wire. A further object is to provide an apparatus in which preselections, or adjustments to change the ratios, of the pressures can be made at any time, as for example when the parts are under load and regardless of the pressures involved. A further object is to adjust the rate of flow of the delivered pressure fluids. Another object is to provide an effective manual operating means for the said adjustment and which is so designed as to avoid the necessity of attachment of the movable manual means to the adjustable ratio-changing element for controlling the movement of the distributor valve. Still another object is to enable such adjusted ratios to be obtained during the time while the pressure fluid is being supplied to the distributor valve. A further object is to provide means to allow a manual setting of the proportionate pressures to be preselected, after which, when the load is taken off the apparatus, the latter automatically resets itself to the new position to deliver the reset pressures.

While my invention is capable of embodiment in many different forms, for the purpose of illustration I have shown only one form of the same in the accompanying drawings, in which—

Fig. 1 is a plan view of an apparatus made in accordance with my invention;

Fig. 2 is an end elevation of the same;

Fig. 3 is a vertical section taken on line 3—3 of Fig. 1;

Fig. 4 is a vertical section taken on line 4—4 of Fig. 1;

Fig. 5 is a vertical section of a plunger stop pin taken on line 5—5 of Fig. 3;

Fig. 6 is a vertical section of one of the lever pivots taken on line 6—6 of Fig. 3;

Fig. 7 is a diagrammatic representation of a front and rear brake controlling system made in accordance with my invention;

Fig. 8 is an elevation of the instrument panel used therewith; and

Fig. 9 is a vertical section of said instrument panel on line 9—9 of Fig. 8.

In the drawings, I have shown an instrument panel 1, on a dashboard 1a of an automobile, the upper part of which is triangular in shape, having a mounting plate 1b fitting on the dashboard 1a and carrying a vacuum gauge 2 connected by a pipe 3 to any suitable source of vacuum. This source of hydraulic fluid under pressure may be provided and controlled, for example, in accordance with the apparatus shown and described in my copending application upon Intensifier for the application of power, Ser. No. 507,227, filed October 20, 1943. The said panel carries, also, a gauge 4 connected by a pipe 5 to a pipe 6 for operating the front wheel brakes and, also, contains a dial 7 connected by a pipe 8 to a pipe 9 for operating the rear wheel brakes. On the said panel, furthermore, there are provided a front brake handle 10 and a rear brake handle 11 which are mounted, respectively, on levers 12 and 13 passing through slots 14 and 15 in said panel 1. The levers 12 and 13 are carried by a pivot pin 16 mounted on a frame 17 which is located behind the panel 1. The said frame 17 has two ears 18 and 19 for supporting the pivot pin 16, and has two sectors 20 and 21 having racks which cooperate with buttons 22 and 23 on the levers 12 and 13, respectively, to hold them in any adjusted position. Furthermore, it will be noted that the levers 12 and 13 have lever arms 24 and 25 carrying headed pivot pins 26 and 27 which pass through slots 28 and 29 in operating members 30 and 31 which are attached, respectively, to Bowden wires 32 and 33. A washer 34 and a cotter pin 35 are carried by each of the rods 26 and 27 to hold them in place in the operating members 30 and 31, respectively. The said Bowden wires 32 and 33 pass through flexible conduits 36 and 37 which are fastened in an angularly shaped cross member 38 on an arm 39 forming a part of the frame 17. The two Bowden wires 32 and 33 lead, respectively, to proportional pressure distributors 40 and 41, both of which are constructed alike and which are connected to an inlet pipe 42 provided with a modulated hydraulic pressure fluid and which may be supplied from any suitable control apparatus, preferably manually controlled, as disclosed in detail in my copending application above referred to. It will be understood, in other words, that the pipe 42 is arranged to supply or release the modulated pressure liquid, as desired, for the control of any desired mechanism. This pipe 42 has branch pipes 43 and 44 leading to the proportional pressure distributor valves 40 and 41. The proportional distributor valve 40, also, is connected to the pipe 6, which has branch pipes 45 and 46 leading to the usual wheel brake cylinders 47 and 48 controlling the operation of brake shoes 49 and 50. Likewise, the proportional distributor valve 41 is connected to the pipe 9 which leads by branch pipes 51 and 52 to the usual wheel brake cylinders 53 and 54 controlling brake shoes 55 and 56.

Inasmuch as the two proportional distributor valves 40 and 41 are constructed exactly alike, I have shown the detailed construction of only one of the same in Figs. 1 to 6, the same being, for example, the proportional distributor valve 41 which is connected to the flexible conduit 37 containing within the same the Bowden wire 33. The proportional distributor valve 41 has a casing 57, into one side of which there is screw-threaded a sleeve 58 having screw-threaded to the same a clamping nipple 59 provided at its outer end with ears 60 adapted to be clamped together by a bolt 61 in order to clamp within the same one end of the conduit 37. On the end of the Bowden wire 33 there is secured a sleeve 62 by means of a screw 63, which holds in place a helical spring 64 around the Bowden wire 33 within the sleeve 58. The said sleeve 62 has its forward movement limited by a shoulder 65 on the interior of the sleeve 58, the said shoulder being adjacent to an opening 66 provided to receive an adjusting rod 67 which abuts against the end of the sleeve 62. When assembling the conduit 37 and the Bowden wire 33 in the proportional distributor valve 41 it will be understood that the bolt 61 is first loosened, after which the conduit 37, with the Bowden wire 33 therein, is forced into the sleeve 58 against the adjacent end of the adjusting rod 67, after which the said bolt 61 is tightened to securely clamp the end of the conduit 37 in place. The other end of the adjusting rod 67 rests against a compressed helical spring 68 carried in a recess 69 in a screw plug 70 screw-threaded into the casing 57. This end of the adjusting rod 67 is supported within a cylindrical web 71 formed on the casing 57, and the said web is provided with a laterally directed set screw 72 (see Fig. 5) having an end 73 which acts as a stop by passing through a recess 74 formed on the side of the rod 67. The recess 74 cooperating with the stop 73 limits the movement of the adjusting rod 67 and, also, prevents the said rod 67 from turning. Furthermore, the said rod 67 has located at the center thereof a vertical hole 75 carrying loosely within the same a pin 76 having an upper flat surface 77 and a lower rounded end 78. The flat end 77 provides stability for the adjusted position of the pin 76. The rod 67, accordingly, can be moved into different adjusted positions to the right or left, as desired, according to the proportional pressures desired to be transmitted by the apparatus. For this purpose, the laterally adjustable pin 76 is carried between the faces of an upper valve lever 79 and a lower valve lever 80 which are carried on pivot pins 81 and 82, respectively, supported within the casing 57. Both of these pivotal supports are constructed the same, and by way of example I have shown, in Fig. 6, a cross-section of the support for the pivot pin 82. One end of the pin 82 is carried in a recess 83 in the casing 57 so as to support the valve lever 80, and the other end of the pin 82 carries a sleeve 84 which is maintained in place by a cover plate 85 attached by screws 86 to the side of the casing 57. On the other side, said casing 57 has a plurality of screw holes 87 for attachment to the proportional distributor valve 41 to any desired support on the chassis of the automobile.

This valve lever 80, on its lower face, is in contact with a rounded head 88 on a fluted rod 89 supported in a recess 90 in a plunger 91 carried in a cylinder 92 within the casing 57. The said plunger 91 has an annular rubber seal 93 around its periphery and is, also, provided with a centrally located projection 94 extending downwardly into contact with a fluted valve stem 95 on a tapered valve 96 which seats against a valve seat 97 on a removable valve sleeve 98 which is provided with a peripheral rubber seal 99 and which is held in place by a split ring 100 located within the cylindrical passageway 92. The valve stem 95, beyond the conical valve 96, has a reduced end 101 for positioning thereon a helical spring 102, located in a recess 103 within a screw plug 104 screw-threaded in said casing 57. Above the sleeve 98 there is a chamber 105 for receiving the hydraulic fluid under pressure, which is adapted to be admitted by the conical valve 96. The said chamber 105 has two outlet ports 106 and 107, the ports 106 being normally closed by a screw plug 108, while the port 107 is connected to the pipe 9 which leads to the rear wheel brakes. Beneath the conical valve 96 there is an annular chamber 109 which receives the pressure liquid from an inclined passageway 110 leading to a vertical passageway 111 closed at the top by a plug 112 and which communicates with an inclined passageway 113 leading to a chamber 114 closed by a screw plug 115 in the upper portion of the casing 57. This chamber 114 has two ports 116 and 117, the latter of which, port 117, is connected to the pipe 44 while the former, port 116, in the apparatus as shown herein, is normally closed by a screw plug 118, inasmuch as in the apparatus as shown I have provided the proportional distributor valve 40 for operating the front brakes and the proportional distributor valve 41 for operating the rear wheel brakes. However, it will be understood that instead of having a separate proportional distributor valve for controlling each of said sets of brakes, a single proportional distributor valve 41 could be used by merely removing the plug 118 and connecting the port 116 to the pipe 6. Within the chamber 114, furthermore, there is a plunger 119, having a peripheral rubber seal 120, similar to the plunger 91. This plunger 119 has on its upper face a projection 121 to act as a guide for a helical spring 122, which rests against the plug 115. The said spring 122 tends to force the plunger 119 downwardly and said plunger 119 carries within the same a fluted rod 123 having thereon a rounded head 124 which rests against the upper face of the valve lever 79. The lower face of the valve lever 79 rests against the flat surface 77 on the upper end of the pin 76.

In the operation of my apparatus, it will be understood that the pressures from the hydraulic fluid delivered to the front wheel brake cylinders 47 and 48 are registered on the dial 4 while the pressures on the rear wheel brake cylinders 53 and 54 are registered on the dial 7. These two pressures are not only controllable by the manually modulated pressures received from the pipe 42, but are individually controllable, respectively, by the handles 10 and 11, which can be moved to adjust the desired pressures and so as to remain in their adjusted position by reason of the racks or sectors 20 and 21. The adjustment of each of the Bowden wires 32 and 33 connected thereto results in the desired adjustment of the position of the vertical pin 76, which is displaceable between the oppositely pivoted valve levers 79 and 80 so as to obtain the desired ratio, or even a 1 to 1 ratio, and irrespective of whether or not the pistons 91 and 119 are the same size as each other. However, as the end of the Bowden wire 33 acts as an adjustable abutment not fastened to the rod 67, owing to the slot 28 and the springs 64 and 68 when the load from the upper and lower valve levers 79 and 80, respectively, is released from the pin 76 the rod 67 will move to the left in Fig. 3 against the wire 33, due to the spring 68, so as to move the wire 33 as far as the slot 28 will permit, see Fig. 9, when the pin 76 is free to move, or the rod 67 will be moved to the right in Fig. 3, by the spring 64, which is stronger than the spring 68, when the manual adjustment is made in this direction. This permits preselection of the ratio in either direction without strain on or possible breakage of the Bowden wire. This will be evident from the fact that the slot 28 permits the pin 26 to be moved or adjusted to the left, in Fig. 9, without moving the Bowden wire 32 or 33, so that when pressure on the vertical pin 76 is relaxed the spring 64, which is stronger than the spring 68, will move the spring 67 to the right, in Fig. 3, to its new adjusted position. If, on the contrary, the pin 26 is adjusted towards the right, in Fig. 9, the sleeve 62 will be moved to the left, in Fig. 3, away from the rod 67, and when the pressure is relaxed on the pin 76 the spring 68 will move the pin 76 to the left, in Fig. 3, to its new adjusted position. By this means, in each of the two proportional distributor valves 40 and 41, a definite adjusted proportional pressure is obtainable and preselectable in each of the pipes 6 and 9 with regard to the pressure received through the pipe 42. In this way an adjusted constant differential of pressures between the pressure in pipe 6 and the incoming pressure in the pipe 42 can be secured, and the same is true with regard to the pressure in pipe 9. The adjusted differential pressure in each of these instances is, of course, due to the position of the pin 76 between the adjacent faces of the valve levers 79 and 80, so that the pressure delivered from the outlet port 107 is an adjusted constant differential with regard to the pressure in the inlet port 117 due to the ratios in the effective lever lengths of the valve operating levers 79 and 80. In this way, also, the proportional relationship may be maintained between the pressures in the pipes 6 and 9. For example, the manually controlled and modulated pressure liquid received by the pipe 42 immediately acts on the plunger 119 of the distributor valves 40 and 41 and thereupon immediately establishes, by means of the levers 79 and 80, the pin 76, plunger 91, and the valve 96, 97, a definite differential of pressures in the chambers 114 and 105, inasmuch as the pressure liquid from the chamber 114 is transmitted through the passageways 113, 111 and 110 to the chamber 109 and thence past the valve 96 to the chamber 105, the position of the valve 96 being controlled in this way to maintain the adjusted differential of pressures. Upon any relaxation of the pressure in the pipe 44, this will cause the pressure in the chamber 105 of the distributor valves 40 and 41 to exceed the pressure in the chamber 109, thus causing the escape, to that extent, of the liquid downwardly past the valve 96, 97, upwardly through the passageway 111, and thence to the chamber 114 and the port 117.

As pointed out above, however, it will be obvious that a single one of the proportional distributor valves 40 and 41 may be used for controlling both the pressure in the pipes 6 and 9 so as to maintain the definite adjusted differential of pressures applied thereto and for which purpose the plug 118 will be removed so as to connect the port 116 to the pipe 6 while the pipe 9 would still be connected as before. In that event, the single handle 11 would control the differential and the other proportional distributor valve 40 and its connections would be eliminated.

While I have described my invention above in detail I wish it to be understood that many changes may be made therein without departing from the spirit of the same.

I claim:

1. In combination, an adjusting member, a plunger on which it is carried, a spring for moving the plunger in one direction, a casing for said plunger, a Bowden wire for preselecting the adjustment of the position of the plunger, a flexible conduit for the Bowden wire adapted to be secured to said casing, an abutment secured to said wire and having a lost-motion position with relation to said plunger, and a second spring for moving the plunger to its above mentioned position of adjustment in opposition to its movement by said first mentioned spring.

2. In combination, an adjusting member, a plunger on which it is carried, a spring for moving the plunger in one direction, a casing for said plunger, a Bowden wire for preselecting the adjustment of the position of the plunger, a flexible conduit for the Bowden wire adapted to be secured to said casing, an abutment secured to said wire and having a lost-motion position with relation to said plunger, and a second spring for moving the plunger to its above mentioned position of adjustment in opposition to its movement by said first mentioned spring, located around the wire within said casing between the abutment and said conduit.

3. In combination, an adjusting member, a plunger on which it is carried, a spring for moving the plunger in one direction, a casing for said plunger having a clamp and a cylinder, a Bowden wire extending into the cylinder for preselecting the adjustment of the position of the plunger, a flexible conduit for the Bowden wire adapted to be secured to said casing clamp, an abutment in said cylinder secured to said wire and having a lost-motion position with relation to said plunger, and a second spring for moving the plunger to its above mentioned position of adjustment in opposition to its movement by said first mentioned spring.

4. In combination, an adjusting member, a plunger on which it is carried, a spring for moving the plunger in one direction, a casing for said plunger having a clamp and a cylinder, a Bowden wire extending into the cylinder for preselecting the adjustment of the position of the plunger, a flexible conduit for the Bowden wire adapted to be secured to said casing clamp, an abutment in said cylinder secured to said wire and having a lost-motion with relation to said plunger, and a second spring for moving the plunger to its above mentioned position of adjustment, in opposition to its movement by said first mentioned spring, located around the wire within said casing between the abutment and said conduit.

5. In combination, an adjustable member, a spring for moving said member in one direction, a fixed support for the member, a Bowden wire which is displaceable relative to said member for preselecting the adjustment of the position of said member, a conduit for the Bowden wire adapted to be secured to said support, and a second spring being operatively connected to said wire and having a fixed support for moving said wire towards said member.

6. In combination, an adjustable member, a spring for moving said member in one direction, a fixed support for the member, a Bowden wire which is displaceable relative to said member for preselecting the adjustment of position of said member, a conduit for the Bowden wire adapted to be secured to said support, a second spring being operatively connected to said wire and having a fixed support, for moving said wire towards said member, and a manual means having a lost motion connection with said Bowden wire.

7. In combination, an adjustable member, a spring for moving said member in one direction, a fixed support for the member, a Bowden wire which is displaceable relative to said member for preselecting the adjustment of the position of said member, a conduit for the Bowden wire adapted to be secured to said support, and a second spring mounted on said conduit and having an abutment secured around the wire for moving said wire towards said member.

8. In combination, an adjustable member, a spring for moving said member in one direction, a fixed support for the member, a Bowden wire which is displaceable relative to said member for preselecting the adjustment of the position of said member, a conduct for the Bowden wire adapted to be secured to said support, a second spring mounted on said conduit and having an abutment secured around the wire for moving said wire towards said member, and a manual means having a lost motion connection with said wire.

9. In combination, an adjustable member, a spring for moving said member in one direction, a fixed support for the member, a Bowden wire which is displaceable relative to said member for preselecting the adjustment of the position of said member, a conduit for the Bowden wire adapted to be secured to said support, and a second spring for moving said wire towards said member, said member having an element with a friction surface subjected to a releasable load normally preventing its movement.

10. In combination, an adjustable member, a spring for moving said member in one direction, a fixed support for the member, a Bowden wire which is displaceable relative to said member for preselecting the adjustment of the position of said member, a conduit for the Bowden wire adapted to be secured to said support, a second spring for moving said wire towards said member, and a manual means having a lost motion connection with said wire, said member having an element with a friction surface subjected to a releasable load normally preventing its movement.

11. In combination, an adjustable member, a spring for moving said member in one direction, a fixed support for the member, a Bowden wire which is displaceable relative to said member for preselecting the adjustment of the position of said member, a conduit for the Bowden wire adapted to be secured to said support, and a second spring for moving said wire towards said member, said member having an element with a friction surface subjected to a releasable load normally preventing its movement, and said member being in the form of a plunger, the ends of which are arranged for cooperative adjustment by said springs and wire, said plunger having a pin and slot connection with said support.

12. In combination, an adjustable member, a spring for moving said member in one direction, a fixed support for the member, a Bowden wire which is displaceable relative to said member for preselecting the adjustment of the position of said member, a conduit for the Bowden wire adapted to be secured to said support, a second spring for moving said wire towards said member, and a manual means having a lost motion connection with said wire, said member having an element with a friction surface subjected to a releasable load normally preventing its movement, and said member being in the form of a plunger, the ends of which are arranged for cooperative adjustment by said springs and wire, said plunger having a pin and slot connection with said support.

EDWARD A. ROCKWELL.

REFERENCES CITED

The following references are of record in the file of this patent:

UNITED STATES PATENTS

| Number | Name | Date |
|---|---|---|
| 1,927,615 | Ponti | Sept. 19, 1933 |
| 856,888 | Laflin | June 11, 1907 |
| 1,472,786 | Berggren | Nov. 6, 1923 |

FOREIGN PATENTS

| Number | Country | Date |
|---|---|---|
| 366,246 | France | Sept. 29, 1906 |